(12) United States Patent
Bonato et al.

(10) Patent No.: US 11,452,263 B2
(45) Date of Patent: Sep. 27, 2022

(54) DISBUDDING SECATEURS

(71) Applicants: Claudio Bortolussi, Fiume Veneto (IT); Franco Bortolussi, Fiume Veneto (IT)

(72) Inventors: Luigi Bonato, Ponte di Piave (IT); Cesare Intrieri, San Lazzaro di Savena (IT)

(73) Assignees: Claudio Bortolussi, Fiume Veneto (IT); Franco Bortolussi, Fiume Veneto (IT)

( * ) Notice: Subject to any disclaimer, the term of this patent is extended or adjusted under 35 U.S.C. 154(b) by 100 days.

(21) Appl. No.: 16/339,040

(22) PCT Filed: Oct. 25, 2017

(86) PCT No.: PCT/IB2017/056611
§ 371 (c)(1),
(2) Date: Apr. 3, 2019

(87) PCT Pub. No.: WO2018/083569
PCT Pub. Date: May 11, 2018

(65) Prior Publication Data
US 2019/0254236 A1    Aug. 22, 2019

(30) Foreign Application Priority Data

Nov. 7, 2016    (IT) .......................... 102016000111926

(51) Int. Cl.
*A01G 3/02*    (2006.01)
*B26B 13/06*    (2006.01)

(52) U.S. Cl.
CPC ................ *A01G 3/02* (2013.01); *B26B 13/06* (2013.01)

(58) Field of Classification Search
CPC .. A01G 3/00; A01G 3/02; B26B 13/06; B26B 13/08; B26B 13/10; B26B 17/00; B26B 17/003
(Continued)

(56) References Cited

U.S. PATENT DOCUMENTS

| 137,760 | A | * | 4/1873 | Cady | ....................... B26B 13/06 |
| | | | | | 30/254 |
| 235,427 | A | * | 12/1880 | Graef | ........................ B25B 7/22 |
| | | | | | 7/130 |

(Continued)

FOREIGN PATENT DOCUMENTS

| DE | 888 376 | * | 8/1953 | ............. B26B 13/06 |
| DE | 31 33 821 | * | 3/1983 | ............. B26B 13/10 |

(Continued)

OTHER PUBLICATIONS

Jan. 17, 2018 Search Report issued in International Patent Application No. PCT/IB2017/056611.
(Continued)

*Primary Examiner* — Clark F Dexter
(74) *Attorney, Agent, or Firm* — Oliff PLC

(57) ABSTRACT

A method wherein secateurs provide shaped blades suitable for cutting the buds on the shoots of fruiting plants. In particular, the method is relative to secateurs with blades shaped for cutting the mother bud and the secondary buds of the shoots of grapevines in a simple and effective manner. The blades of the secateurs have in fact been designed so as to adapt them to the curvature of the cross section of the shoots.

9 Claims, 12 Drawing Sheets

(58) Field of Classification Search
USPC .......................................... 30/178, 186, 29
See application file for complete search history.

(56) References Cited

U.S. PATENT DOCUMENTS

| | | | | |
|---|---|---|---|---|
| 327,065 | A | * | 9/1885 | Burton ................ A45D 29/02 132/75.5 |
| 404,736 | A | * | 6/1889 | Sanford ................ B26B 13/00 30/254 |
| 648,224 | A | * | 4/1900 | Triolo ................ B26B 17/00 30/186 |
| 1,681,746 | A | | 8/1928 | Rauh |
| 1,769,401 | A | | 7/1930 | Tancre |
| 1,816,056 | A | * | 7/1931 | Richard ................ B26B 13/06 30/257 |
| 1,840,358 | A | | 1/1932 | Harvey |
| 2,260,724 | A | | 10/1941 | O'brien |
| 2,507,345 | A | * | 5/1950 | Meesook ............ A45D 29/023 30/28 |
| 2,590,024 | A | * | 3/1952 | Lieberman ............ B26B 13/10 76/106.5 |
| 2,677,179 | A | * | 5/1954 | Servilla ................ B26B 13/10 30/256 |
| 5,074,046 | A | * | 12/1991 | Kolesky ............ B23D 29/026 30/250 |
| 5,189,794 | A | | 3/1993 | Kuo |
| 5,478,347 | A | * | 12/1995 | Aranyi ................ A61B 17/29 606/167 |
| 8,523,893 | B2 | * | 9/2013 | Kessler ............ A61B 17/3201 606/174 |
| 10,327,799 | B2 | * | 6/2019 | Matsuo et al. ...... A61B 17/3201 |
| 2005/0149087 | A1 | * | 7/2005 | Ahlberg et al. ............................... A61B 17/320016 606/174 |
| 2011/0240049 | A1 | * | 10/2011 | Kim et al. ............ B26B 13/06 132/200 |
| 2014/0325846 | A1 | * | 11/2014 | Hussain ................ B26B 13/06 30/29 |
| 2016/0235179 | A1 | | 8/2016 | Ho |

FOREIGN PATENT DOCUMENTS

| | | | | |
|---|---|---|---|---|
| DE | 33 08 284 | * | 9/1984 | ............ B26B 13/06 |
| FR | 1160151 | * | 7/1958 | ............ B26B 13/10 |
| GB | 2 449 644 A | | 3/2008 | |

OTHER PUBLICATIONS

Jan. 17, 2018 Written Opinion issued in International Patent Application No. PCT/IB2017/056611.

* cited by examiner

DISBUDDING SECATEURS

TECHNICAL FIELD OF THE INVENTION

The present invention refers to secateurs, or shears, provided with shaped blades suitable for disbudding the shoots of fruiting plants. In particular, the invention is relative to secateurs with shaped blades for cutting off the mother bud and the secondary buds of grapevine shoots.

PRIOR ART

Summer pruning or green pruning of the grapevine contributes, in the same way as winter pruning, to concentrating the growth of vegetation on the parts that form the productive structure of the plant. The operation includes all the actions of removing buds, shoots, leaves and bunches performed during the growth phase and is carried out with specific objectives. In particular, the intention is: to stimulate the growth of the bodies that will form the permanent structure of the vine, maintaining the shape and dimensions of the canopy within the limits of space that can facilitate the implementation of the various plant training practices; to condition the microclimate of the canopy so as to favor the ripening of the fruit and guarantee conditions that are less favorable to the action of pathogens; to modify, in particular cases, the vegetative habitus of the canopy in order to carry out various vine training practices.

The so-called disbudding practice, also known as debudding, is one of the above-mentioned operations which consists in the removal of the buds from the fruiting cane, that is, the two-year old cane that bears the one-year fruit shoots, so as to obtain the programmed spacing of the buds that will grow in the spring to give rise to the fruiting shoots. In fact, if the fruit-bearing canes are not suitably spaced apart the vine puts out too many shoots with an uneven canopy, which on one hand does not favor a proper ripening of the grapes and on the other does not make it possible to carry out the required vine managing operations. In other words, in order to have a plant capable of yielding grapes of good quality it is necessary to favor the exposure of the leaves to the light and to allow suitable spacing for the development of the grape bunches.

Disbudding is therefore an important and delicate operation that is performed manually with the use of conventional pruning shears, or secateurs. These shears are provided with a pair of substantially flat blades that are moved to approach each other, and sometimes to partially overlap each other, through the action of corresponding handles gripped in one hand by an operator. In particular, the operator lays the shear blades open on the shoot or fruiting cane so as to surround the bud to be excised and performs the cut in a conventional manner.

The buds are normally found at the internodes of the shoots and consist of main or larger buds, at the base of which are secondary buds, or offshoot buds, arranged as a crown or portion of a crown around said main buds. The main bud is the one destined to develop into a shoot, while the secondary buds are the ones that usually develop into a shoot if the main bud is damaged and does not develop into a shoot. Consequently, disbudding must be carried out carefully in order to guarantee the removal of not only the main bud but also the secondary buds.

The removal of the bud with the shears is therefore an operation that often must be performed with more cuts, wherein the operator first removes the main bud and then positions the secateurs so as to also remove with one or more cutting actions the secondary buds. In fact, the curvature of the canes forces the operator to adapt the blades to the different tangent points of the cane on which the buds grow.

Clearly, the above operations are laborious and very delicate. In fact, a badly made cut can result in an imperfect removal of the buds, and require repeating the cut, or in an excessive excision, which implies a deep injury on the wood of the fruiting cane, with the risk of seriously harming the viability of the fruiting cane itself.

SUMMARY OF THE INVENTION

The technical problem at the basis of the present invention is thus to design secateurs that are capable of facilitating the disbudding operation and at the same time reducing or eliminating the risk of a simultaneous imperfect or excessive removal of the main and secondary buds.

This problem is solved with disbudding shears comprising a pair of specially shaped blades.

A first objective of the invention is therefore a pair of disbudding secateurs having shaped blades that are easy to use to perform in a single cut the removal of all the selected buds along a fruiting cane.

A second objective is a pair of disbudding secateurs having shaped blades such as to adapt to the portion of the fruiting cane bearing the buds.

A further objective is a pair of secateurs having blades shaped so as to simplify the cutting operations that may have to be carried out around the external surface of the fruiting cane that carries the buds to be removed.

A still further objective is a method of disbudding fruiting plants comprising the use of the above-mentioned secateurs.

BRIEF DESCRIPTION OF THE FIGURES

Further characteristics and the advantages of the disbudding secateurs of the present invention will become more evident from the following description of a pair of embodiments given purely by way of example and without limitations with reference to the following figures, wherein.

DETAILED DESCRIPTION OF THE INVENTION

Figure 1:
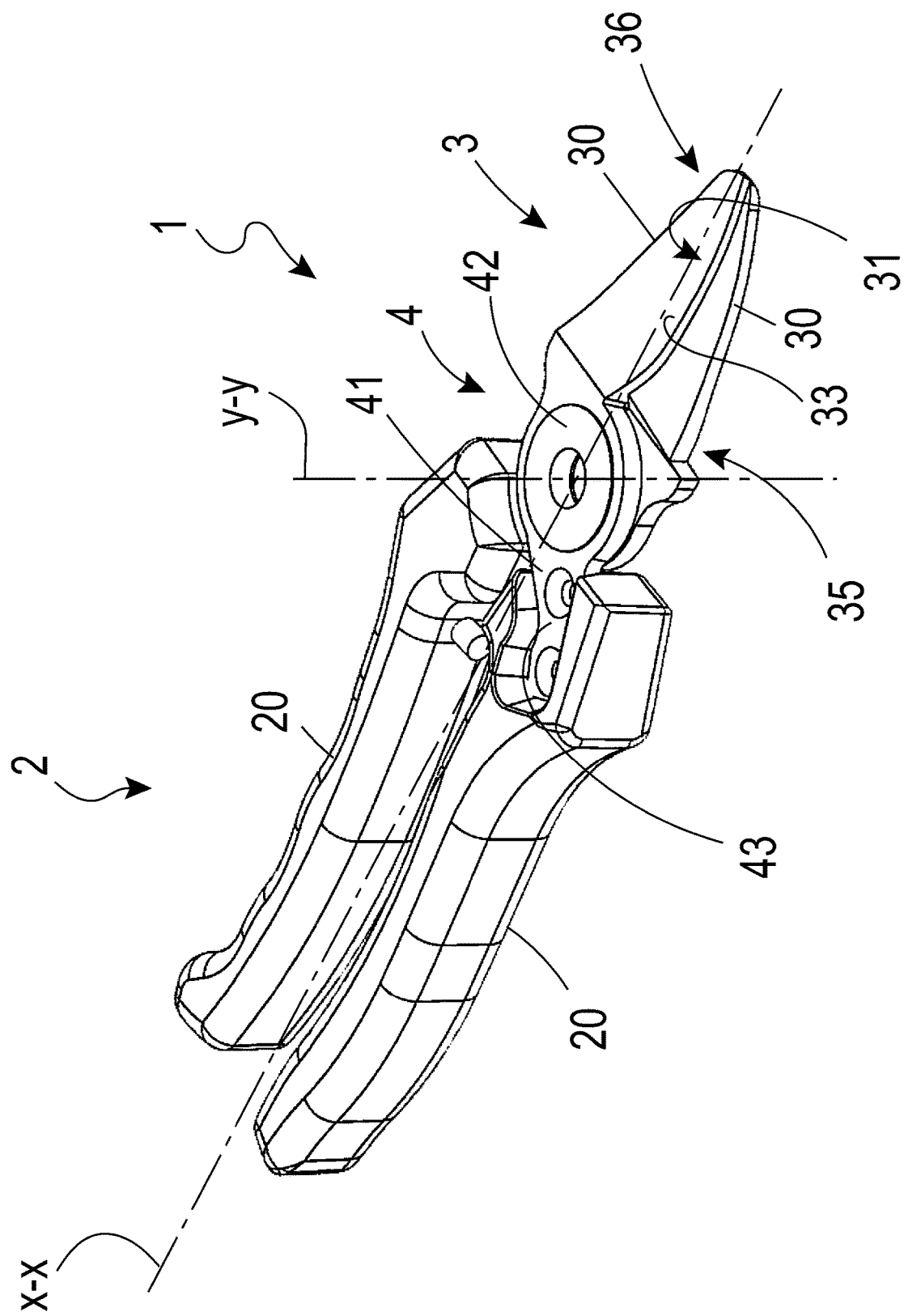
FIG. 1 is an axonometric view from above of a pair of secateurs according to a first embodiment of the present invention.

The basic idea of the present invention is to create a pair of secateurs that simplify as much as possible the disbudding operation. In practice, this operation needs to be performed with simple but at the same time effective movements aimed at the removal of all the selected buds along a fruiting cane with the least number of cuts and without damaging the fruiting cane.

It has been apparent that the conventional secateurs do not have a shaped form such as to adapt as much as possible to the shape of the shoot in correspondence of the buds to be cut. In fact, the blades with their substantially flat shape can lay on straight points of the wood of the fruiting cane. Consequently, the cut can be carried out only on a plane tangential to the fruiting cane.

Conversely, a devised solution was to shape the blades so as to form a cutting surface that adheres at least in part to the curvature of the wood, both longitudinally and transversely to the growth of the wood.

With reference to FIGS. 1 to 4, the reference numeral 1 indicates a pair of disbudding secateurs for woody or semi-woody plants, according to a first embodiment of the invention.

The secateurs 1 comprise a grip portion 2 and a cutting portion 3 arranged in a conventional manner along a longitudinal axis X-X.

The grip portion 2 consists of two branches or handles 20 to be gripped with one hand by an operator. The handles 20 are fully conventional and, for example, can be ergonomic to facilitate both the hand-held grip and the control of the blades, that is, one handle has a convexity that adapts to the palm of the hand and the other handle has a series of indents that adapt to the fingers of the hand. They also can be covered with comfortable material, such as anti-slip and anti-sweat soft plastic. They can be of variable length depending on the standards that can be foreseen from studying the size and the shapes of the hands of the operators.

Figure 2:
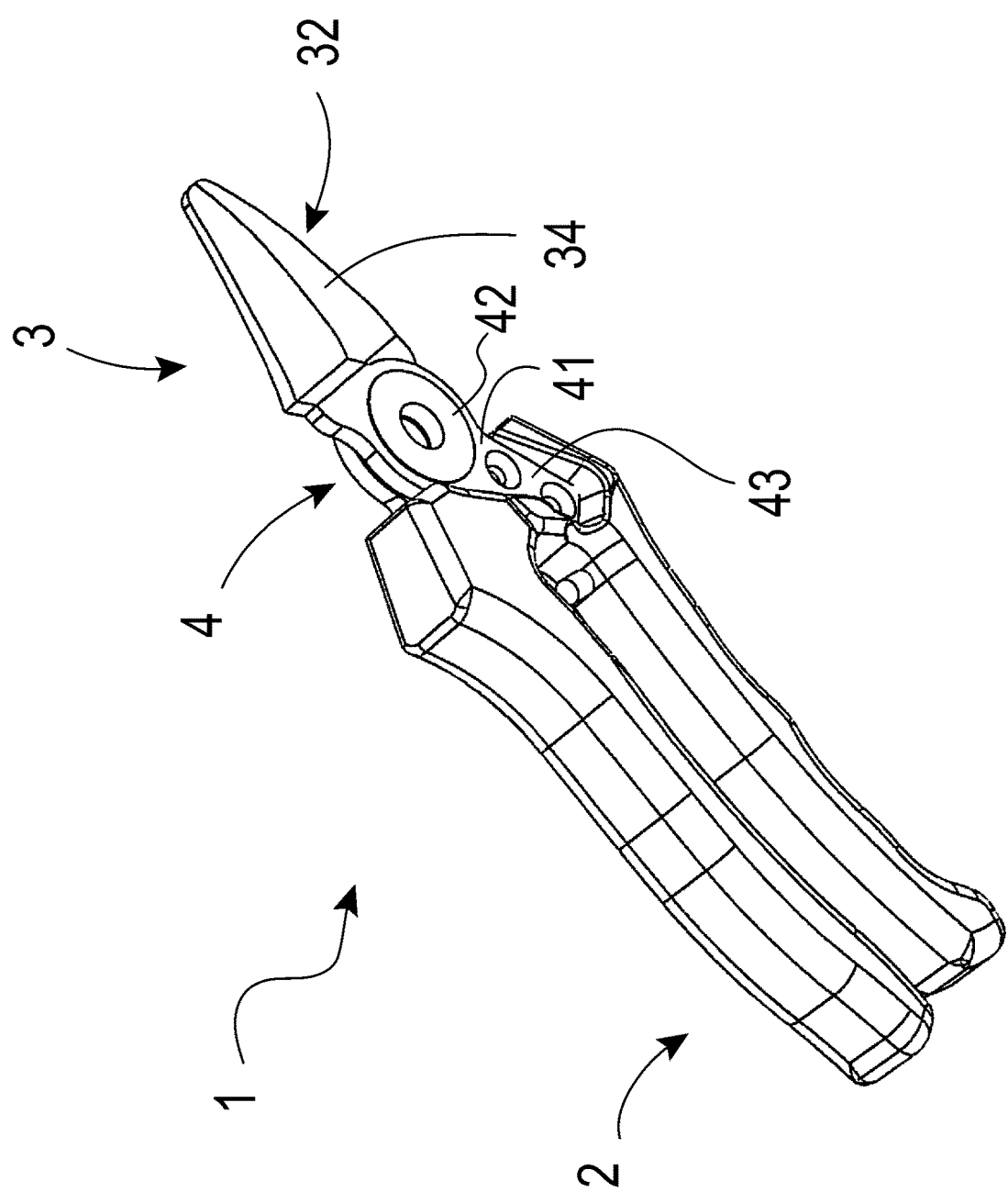
FIG. 2 is an axonometric view from below of the secateurs of FIG. 1.

The handles 20 are connected to the cutting portion 3 through a corresponding conventional joint 4. In particular, the joint 4 comprises two arms 41 that cross each other and overlap at an articulated joint 42 (FIGS. 1 and 2). Further, a connecting portion 43 for each arm 41 connects the handles 20 with the articulated joint 42. In effect, the two arms overlap and cross each other, sharing a central rotation axis Y-Y arranged orthogonally with respect to the axis X-X of longitudinal extension of the grip portion 2 and of the cutting portion 3 of the secateurs 1.

Figure 3:
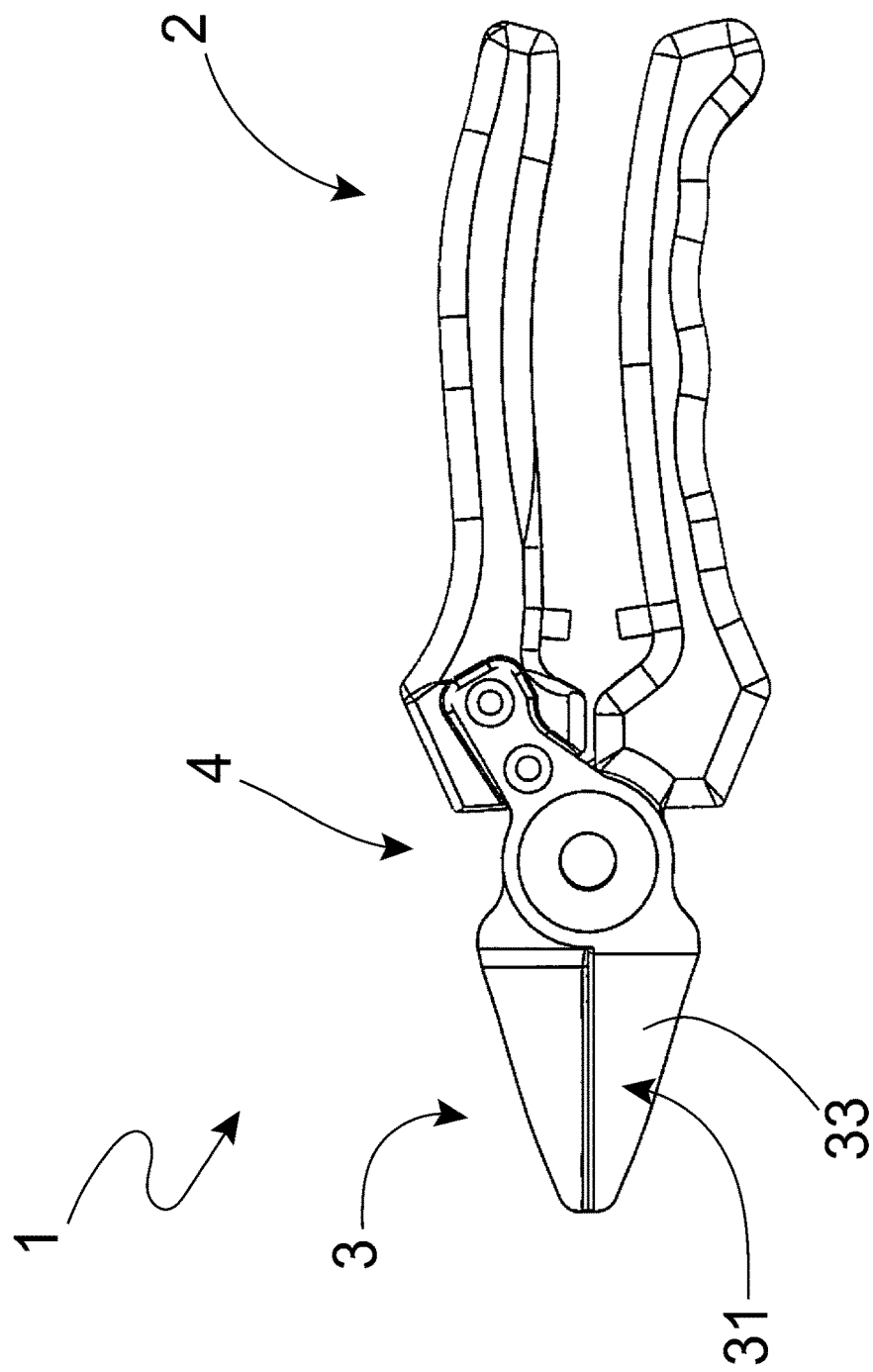
FIG. 3 is a top-down view of the secateurs of FIG. 1.
Figure 4:
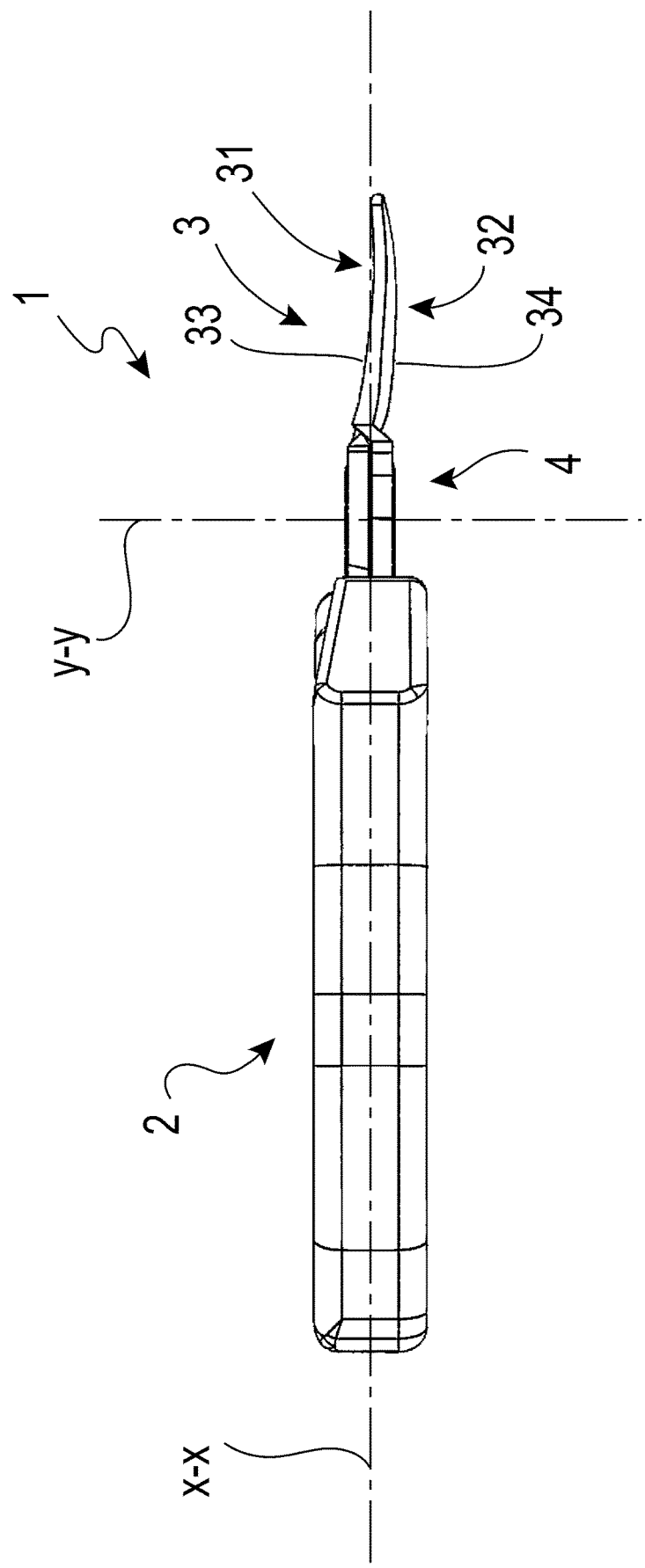
FIG. 4 is a side view of the secateurs of FIG. 1.
Figure 5:
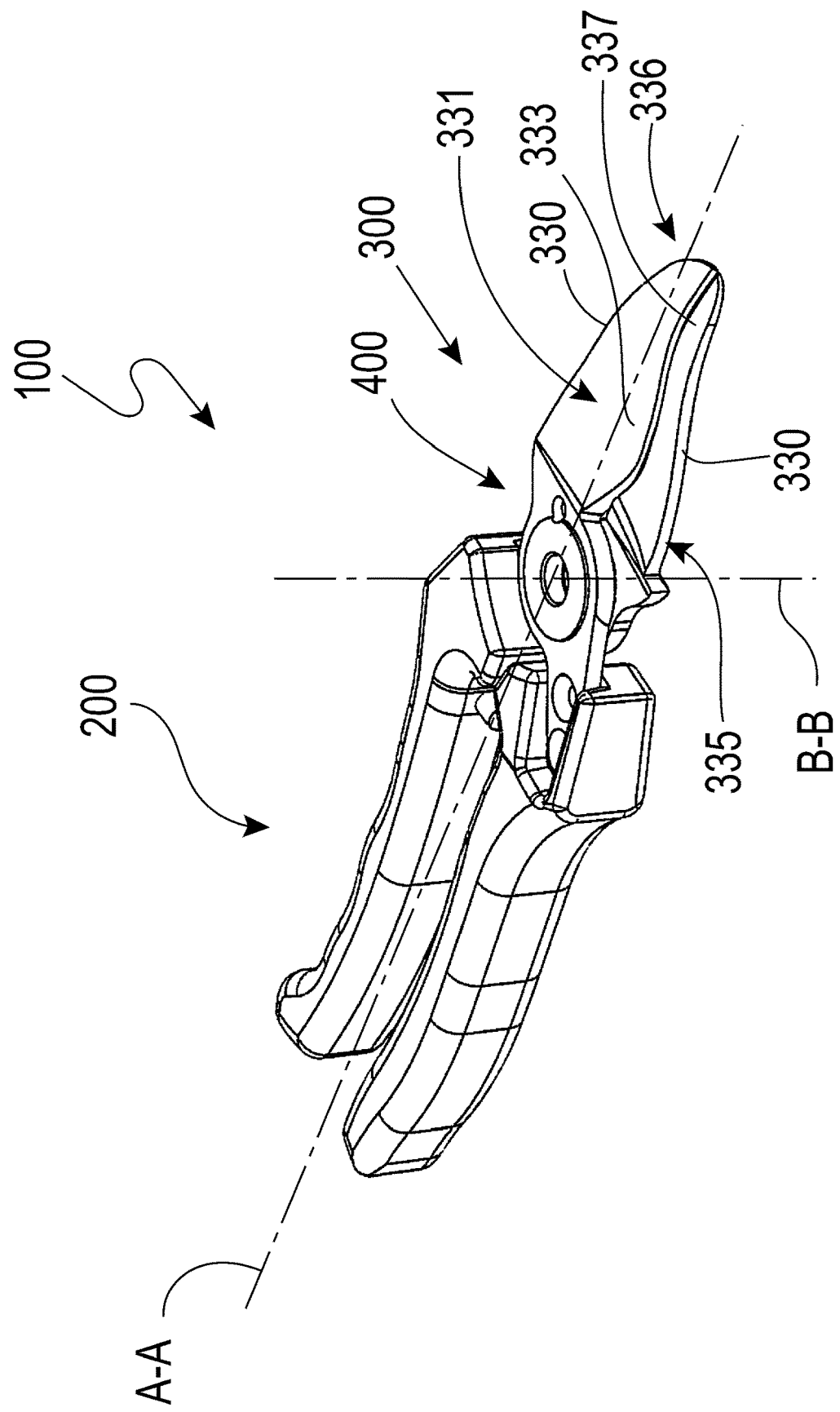
FIG. 5 is an axonometric view from above of a pair of secateurs according to a second embodiment of the present invention.
Figure 6:
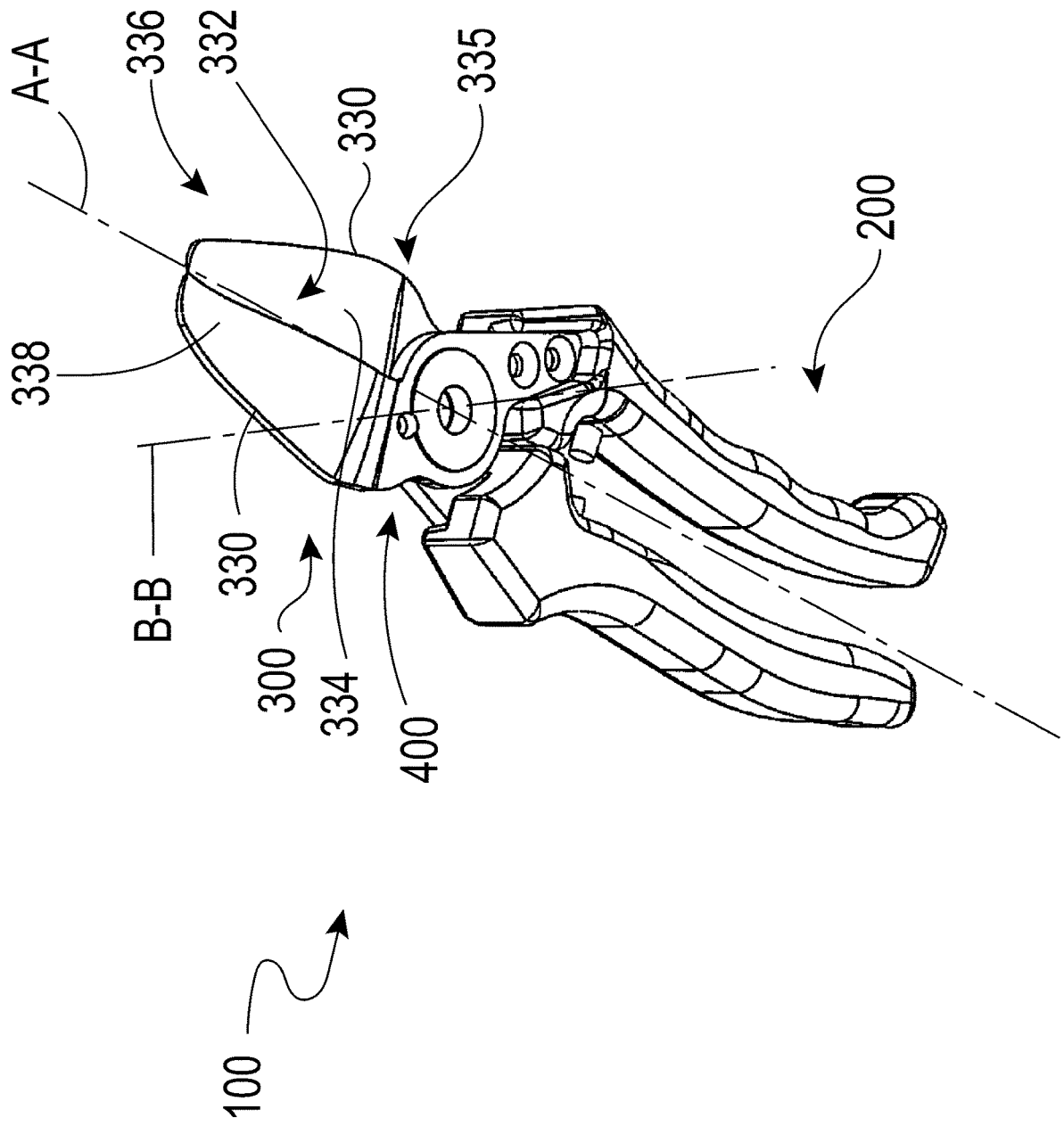
FIG. 6 is an axonometric view from below of the secateurs of FIG. 5.
Figure 7:
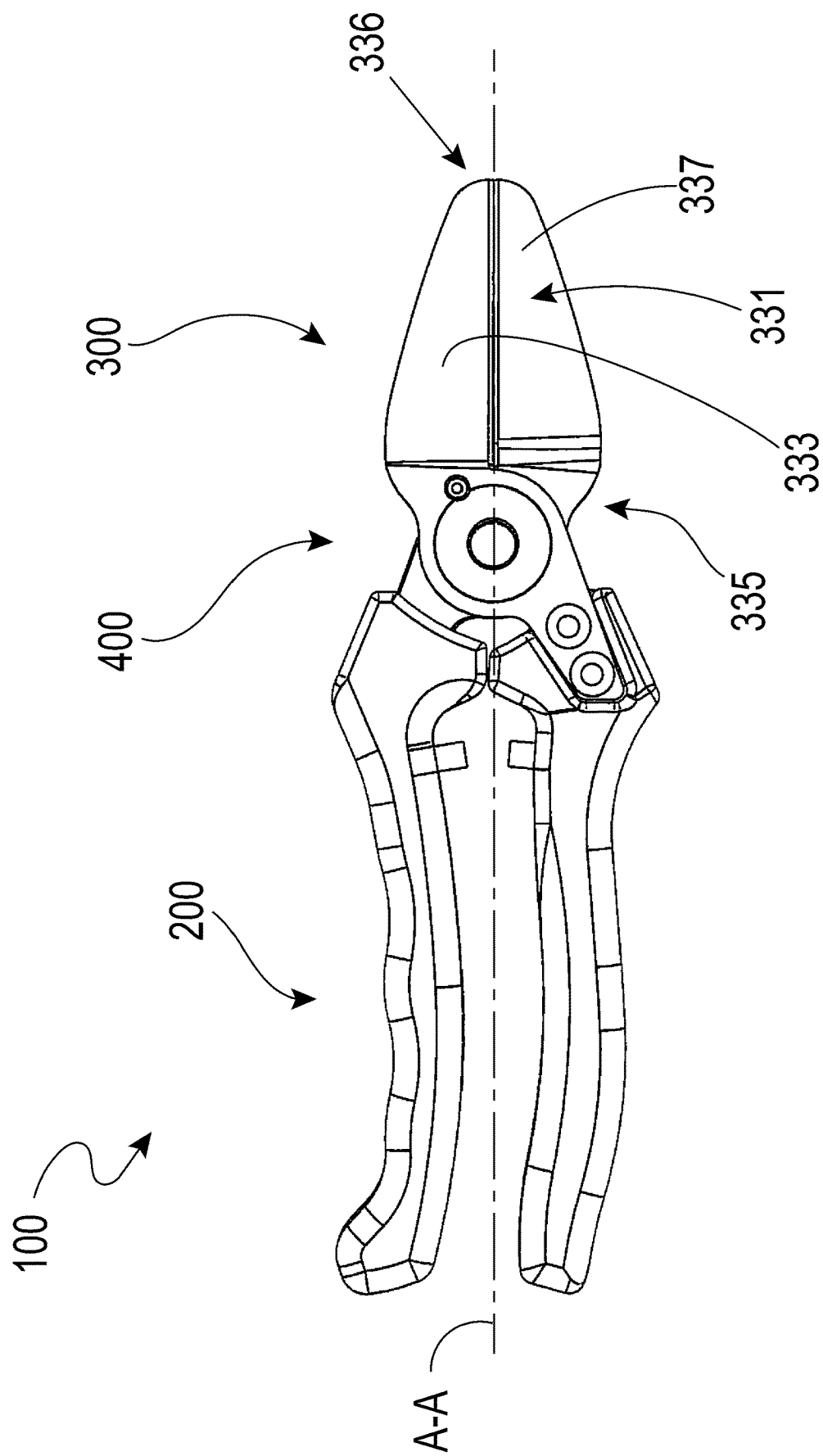
FIG. 7 is a top-down view of the secateurs of FIG. 5.
Figure 8:
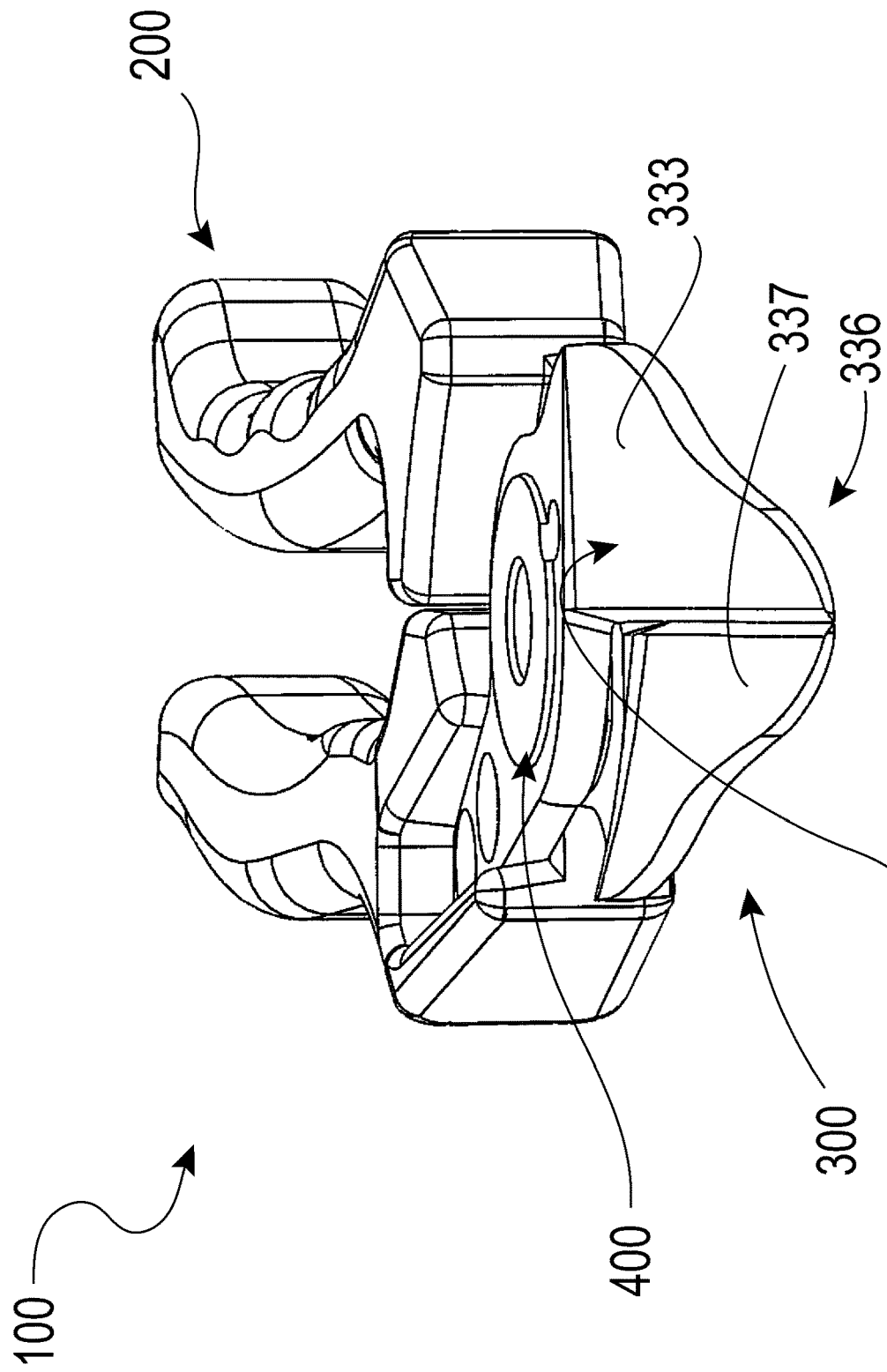
FIG. 8 is a front view of the secateurs of FIG. 5.
Figure 9:
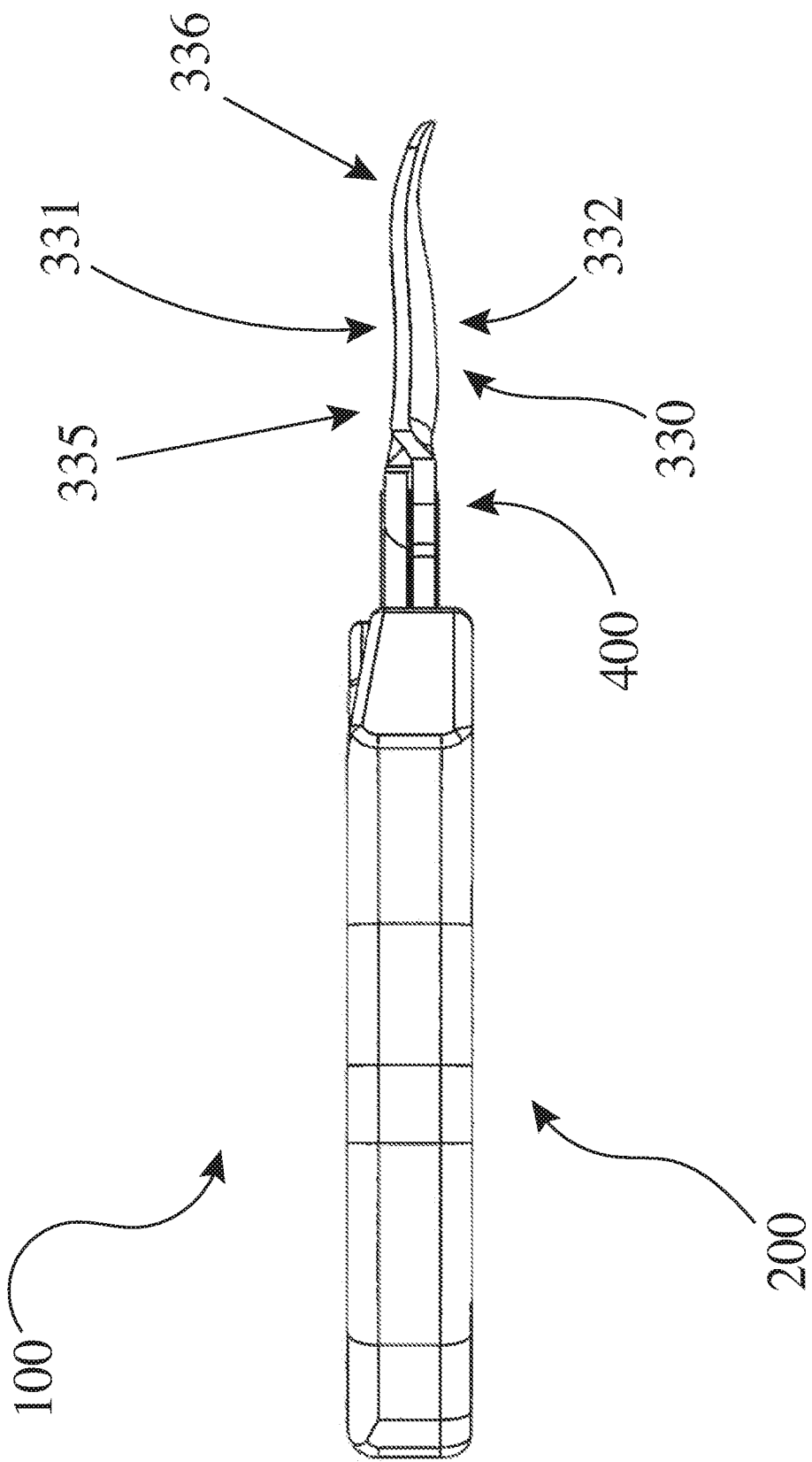
FIG. 9 is a side view of the secateurs of FIG. 5.

The cutting portion 3 comprises two blades 30 that extend along said axis X-X in a substantially symmetrical manner starting from the articulated joint 42 in a direction opposite the handles. The blades 30 have a proximal portion 35 and a distal portion 36 with respect to the joint 4. Also, the blades 30 define a first face 31 and a second face 32 opposite each other and identifying two planes lying on said longitudinal axis X-X, that is, they are generally orthogonal with respect to the axis Y-Y of rotation of the joint 4 (FIG. 4). Advantageously, the two blades 30 display a concavity 33 that lies on the first face 31 (FIGS. 1 and 3) and a corresponding convexity 34 (FIG. 2) that lies on the second face 32 of the blades. In particular, the concavity 33 has a radius of curvature along the axis X-X in correspondence of the cutting edge of the blades between 30 and 70 mm, preferably between 55 and 65 mm. Following extensive experiments, it was seen that this curvature radius allows the cutting edge of the blades to rest longitudinally on the shoot and to cut it so as to excise the buds on an extension of its surface sufficiently large to generally include both the main bud and the secondary buds with a single cut. Also, the cut is not too deep, so as to avoid damaging the shoot itself. The radius of curvature of the convexity 34, always in correspondence of the cutting edge of the blades 30 and along the longitudinal axis X-X will be identical.

Preferably, the radius of curvature of the above-mentioned convexity 34 transversal to the axis X-X is between 40 mm and 60 mm, preferably between 50 and 60 mm. The corresponding radius of curvature transversal to the axis X-X of the concavity 33 will be generally analogous, taking into account the thickness of the blades that conventionally decreases toward the cutting edge in a transversal direction. This configuration is such as to make the cut easier and favor the removal of the desired material.

In addition, again preferably, the concavity 33 of the blades 30 extends 30-60 mm along the longitudinal axis X-X. Similarly, the convexity 34 has an identical extension (FIGS. 3 and 4).

Preferably, the shape of the blades 30 tapers from their proximal portion 35 toward the distal portion 36.

The above-mentioned curvature radius of the cutting edge of the blades along the longitudinal axis X-X, preferably in combination with the curvature radius of the concavity of the transversely to the axis X-X, has been studied to enable advantageously the blades 30 to follow the curvature of the external surface of the wood of the fruiting shoot of trees so as to surround with their internal cutting edge all the buds to be removed. In other words, it was observed that thanks to said curvature and shape of the blades it is possible to perform a very precise cut that starts from the base of the main bud and also includes the secondary buds.

Figure 10:
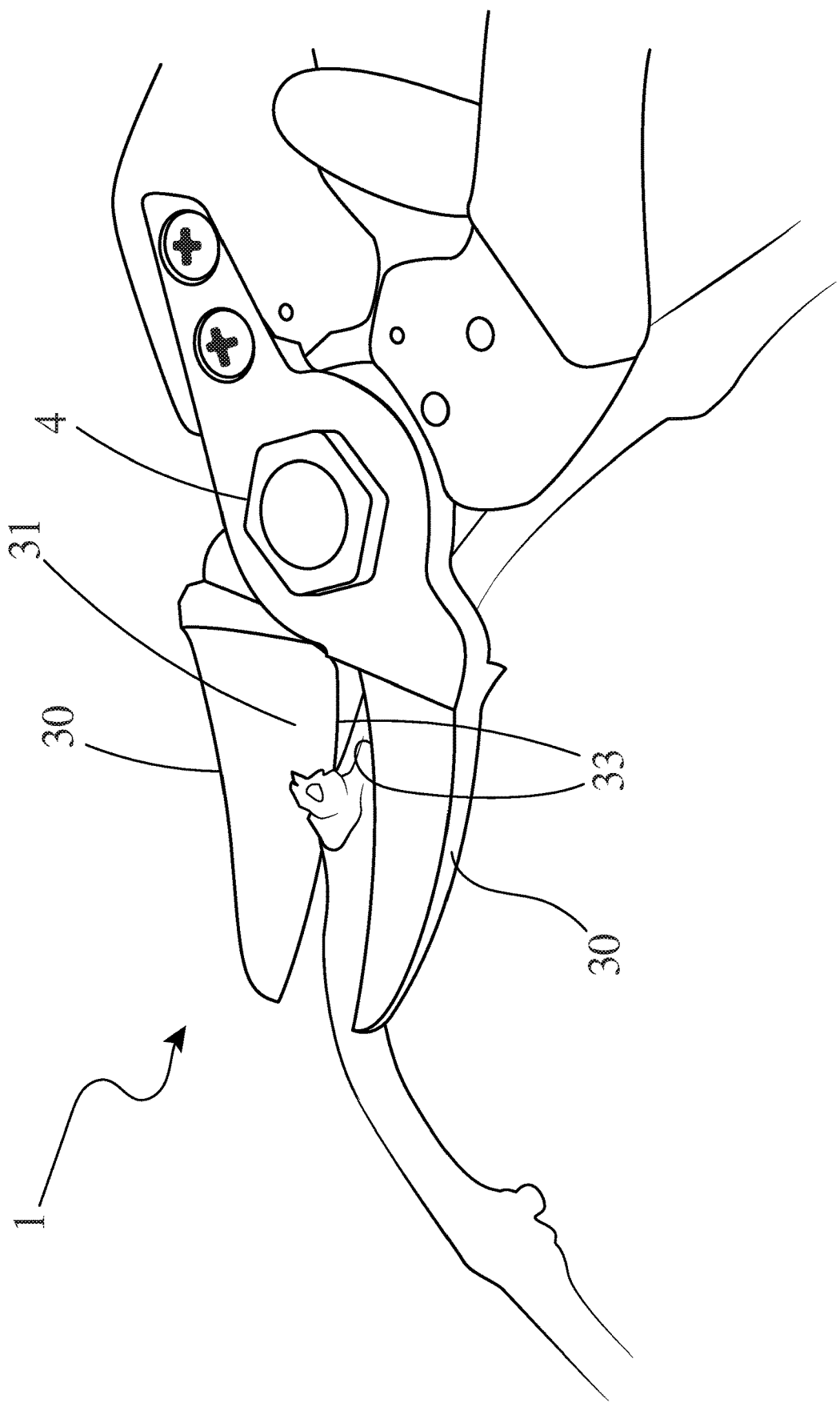
FIG. 10 is an axonometric view of the secateurs of FIG. 1 in use.

In practice, if the secateurs 1 are positioned with their blades 30 in line with the longitudinal axis of the section of fruiting cane on which the buds to be excised are located, the shape of the blades adapts perfectly to the surface of the wood to allow the cutting of all the buds, both the main one and the secondary ones, with a single stroke of the shears (FIG. 10).

In fact, it should be noted that the main bud and its secondary buds surrounding in a ring arrangement are generally located along a definite section limited by the transversal circumference of the wood of the fruiting cane. This observation has led to the designing of the above-mentioned shape. It may happen, however, that the arrangement of the buds is anomalous, but the shape of the blades makes it possible to perform the cut with at most a second positioning of the secateurs.

In accordance with a variant embodiment of the invention, in FIGS. 5 to 9 are indicated with reference numeral 100 secateurs comprising a grip portion 200 and a cutting portion 300.

The grip portion 200 is identical to the grip portion 2 previously described and therefore will not be further described here. The joint portion 400 is also identical to the one previously described. In particular, the secateurs 100 also have the grip portion 200 and the cutting portion 300 located along a longitudinal axis A-A and a joint 400 provided with an axis of rotation B-B orthogonal to said longitudinal axis A-A. In practice, the longitudinal axis A-A and the axis of rotation B-B are identical to the corresponding longitudinal axis X-X and rotation axis Y-Y described with reference to the secateurs 1.

The cutting portion 300 comprises two blades 330 that extend longitudinally in a substantially symmetrical manner from said joint 400 along the longitudinal axis A-A so as to define a proximal portion 335 and a distal portion 336 relative to the joint 400. Moreover, the blades have an opposing first face 331 (FIG. 5) and second face 332 (FIG. 6) that identify two planes lying on said longitudinal axis A A; that is, they are generally orthogonal to the axis of rotation B-B of the joint 400.

Advantageously, the proximal portion 335 has a concavity 333 that lies on the first face 331 (FIGS. 5, 7-9) and a corresponding convexity 334 (FIG. 6) that lies on the second face 332 (FIGS. 6 and 9) of the blades. In particular, the concavity 333 has a radius of curvature of 30 to 70 mm, preferably between 30 and 50 mm, along the axis A-A in correspondence of the cutting edge of the blades. Consequently, the radius of curvature of the convexity 334, again in correspondence of the cutting edge of the blades 330 and along the longitudinal axis A-A will be identical. Preferably, the radius of curvature of the above convexity 334 transversal to the axis A-A is included between 40 and 60 mm, preferably between 40 and 50 mm. The corresponding radius of curvature transversal to the axis A-A of the concavity 333 will generally be similar, taking into account the thickness of the blades that conventionally decreases toward the cutting edge in a transversal direction.

It should also be remembered that the proximal portion 335 of the blades 300 preferably extends along the longitudinal axis A-A for 30-50 mm.

In addition, it should be noted that the secateurs 100 according to the variant embodiment comprise the distal portion 336 or tip portion of the blades 300 having a shape, in longitudinal cross section, opposite to that of the proximal portion 335. In other words, the cutting edge of the blades in the distal portion 336 along the axis A-A has a convexity 337 toward the first face 331 of the blade 300 to which corresponds a concavity 338 toward the second face 332. By contrast, in a transversal direction relative to the longitudinal axis A-A the distal portion 336 on the first face is concave, as it is correspondingly convex on the second face 332, again transversely to said axis A-A. In short, the blades 300 have, in a direction transversal to the axis A-A, the concavity toward the first face 331 along all their length, from the proximal portion 335 to the distal portion 336. In other words, the cutting edge of the blades has a general S-shaped configuration.

Preferably, the convexity 337 on the first face 331 of the cutting edge of the blades 330 has a curvature radius along the longitudinal axis A-A included between 30 mm and 50 mm, and a corresponding concavity 338 on the second face of equal radius on the second face 332. The radius of curvature of the concavity of the distal portion 336 of the blades 330 transversal to the axis A-A on the first face 331 is instead included between 20 and 30 mm. The distal portion 336 is then preferably such as to extend along the longitudinal axis A-A for 20-30 mm.

Also, preferably, the shape of the blades tapers from their proximal portion 335 toward the distal portion 336.

Figure 12:
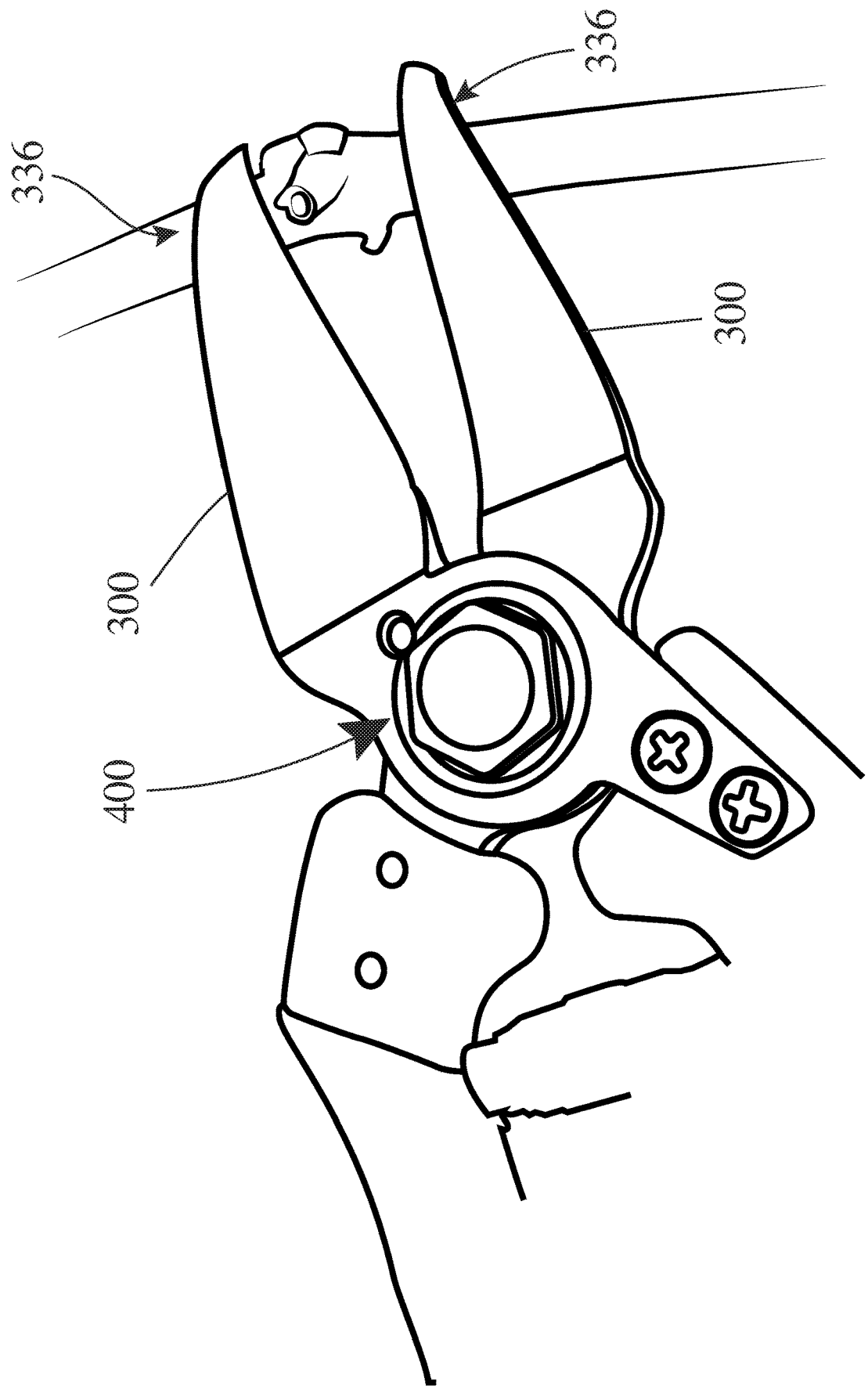
FIG. 12 is an axonometric view of the secateurs of FIG. 5 in a second use condition.

This variant embodiment makes it possible, advantageously, to have a tool that is even easier to handle and more versatile. In fact, the distal end portion of the blades is shaped in such a manner as to adapt, in other word, lie, transversely to the wood of the fruiting cane so as to surround the buds to be cut (FIG. 12), thanks to the concavity of the second surface that extends along the longitudinal axis A-A.

Figure 11:
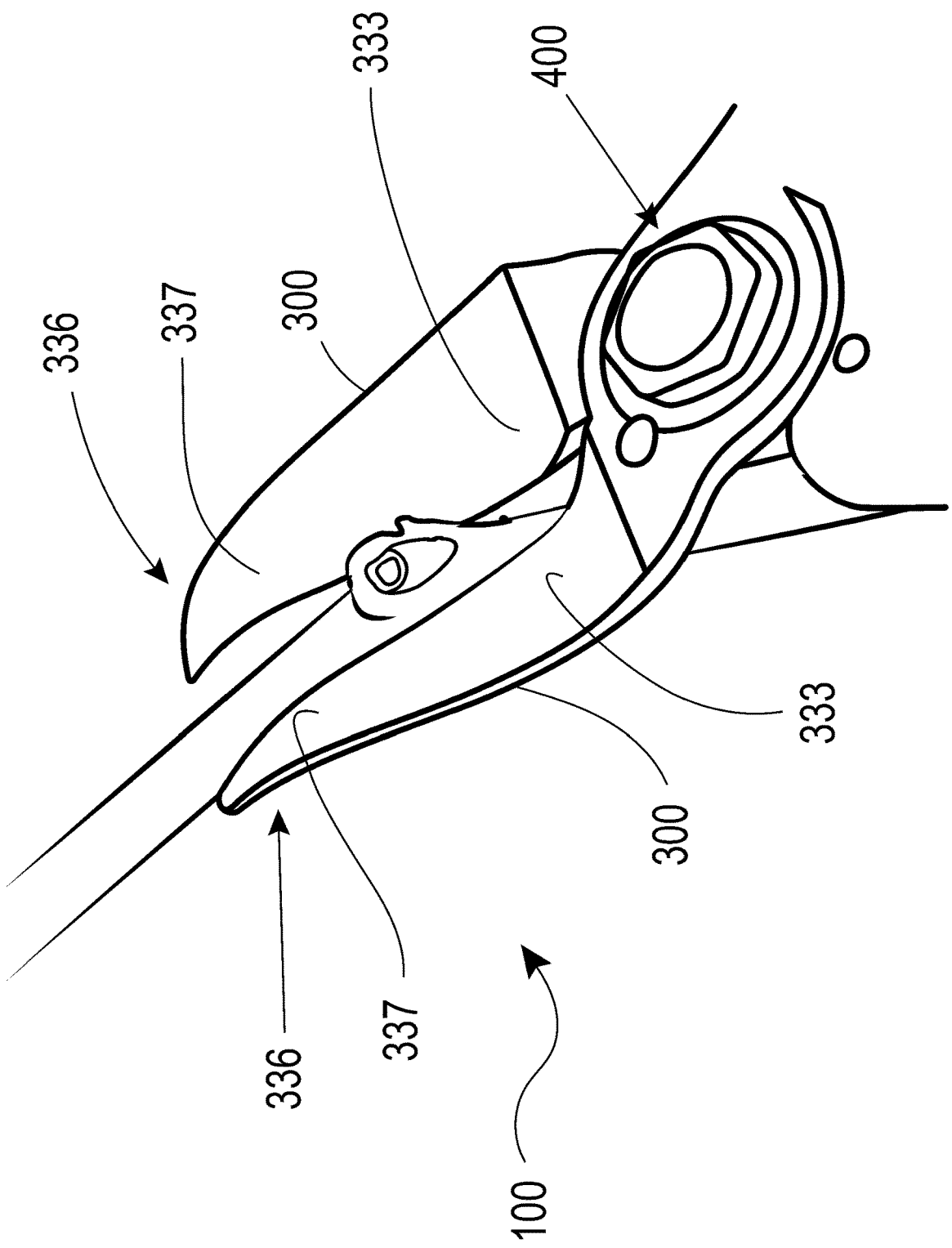
FIG. 11 is an axonometric view of the secateurs of FIG. 5 in a first use condition.

Consequently, the secateurs 100 can be used by positioning the blades 300 both longitudinally (FIG. 11) and transversally (FIG. 12) with respect to the longitudinal axis of the selected portion of the fruiting cane that bears the buds that are to be cut. In this manner, the possibility of cutting all the buds, the main one as well as the secondary ones, with one or at most only two strokes of the secateurs is guaranteed. In addition, the general shape of the blade 300 was studied to allow the best support on the fruiting cane by adapting to the curved surface of the cane. This guarantees an optimal cutting quality, i.e., it is not just possible to remove all the buds, but this is also done without removing other material. In other words, the shape of the blades is such as to avoid removing undesirable vegetable material, and thus the plant is not damaged.

Also, the possibility of positioning the distal portion of the end of the secateurs 100 transversal to the longitudinal axis of the shoot makes it possible to avoid the hindrances that may be due to the carrying wires or the movable wires present especially in the rows of the vineyards containing such shoots, and therefore to perform the cut in a rapid, safe and simple manner.

It should also be noted that the blades are of non-deformable type, since they must be used to excise woody material, that is, material having a certain hardness and consistency. Therefore, the materials that make up the blades must be hard, or better non-deformable, and thus resistant to bending, preferably metallic materials, and still more preferably steel having hardness values of HRC 51-53 in agreement with UNI EN ISO 6508 and ASTM E18 Standard.

A further objective of the present invention is a method of disbudding the shoots of plants, in particular fruit-bearing plants.

In particular, the method comprises the steps of:
a) providing the secateurs previously described;
b) positioning the blades of the secateurs onto a fruiting shoot of a plant so that the convexity of their proximal portion surrounds the main bud and at least part of the related secondary buds, or
c) positioning said blades onto the fruiting shoot transversally to its longitudinal axis so that the concavity of the distal portion surrounds the main bud and at least part of the related secondary buds;
d) performing the cut of the main bud and of the secondary buds with one first action, and if need be,
e) repositioning the blades as in the preceding steps b) or c) and performing a second cut of any remaining buds or portions of buds.

In particular, step b) can be carried out using the secateurs 1 according to the first embodiment and positioning the respective blades 30 along the longitudinal axis of the fruiting cane (FIG. 10). In addition, or alternatively, this step can include one step of positioning the secateurs transversally to said longitudinal axis so as to perform a transversal cut.

Alternatively, the step b) can be carried out using the secateurs 100 according to the second embodiment and positioning the proximal portion 335 of the blades 300 along the longitudinal axis of the fruiting cane to perform a longitudinal cut (FIG. 11) or transversally to the same to perform a first transversal cut.

It should be noted that advantageously, using the secateurs 100 in accordance with the second embodiment it is possible to perform a single cut, in other words to reduce the number of cuts, with the distal portion 336 of the blades positioned transversally on the fruiting cane.

It is now evident that the previously described shortcomings of the disbudding secateurs have been resolved. In fact, repeated and complicated disbudding operations that oblige the operators to work with specific manual precision and deftness are avoided. Moreover, the time required is considerable, especially if the repetitiveness of the cutting operations that have to be carried out on all the fruiting canes of a vineyard is taken into account. Moreover, the risk of making a faulty cut and thus also ruining other parts of the fruiting cane is high.

Conversely, the secateurs according to the present invention make it possible to considerably facilitate the cutting operations, simplifying the positioning of the blades, which occurs in a practically automatic and secure manner. The risk of making undesirable cuts is greatly diminished or eliminated, and the disbudding step is less fatiguing for the operator, thanks to the elimination of joint pains in the hand that are common with such operations.

Numerous variants can be applied by the technician skilled in the field to the secateurs of the invention without however departing from the scope of patent protection of the enclosed claims.

For example, the shapes and lengths of the handles may vary, depending on requirements or preferences. The materials of the blades and the handles can be standard, such as for example metals or metallic alloys. The handles can be knurled or lined with non-slip and/or comfortable materials.

The geometry of the blades may vary depending on particular requirements, without however substantially modifying the shape of the concavity and convexity previously described. Similarly, the width and length of the blades, as well as the respective cutting edges that face each other can vary. For example, the cutting edges can be evenly thinned, undulating in a longitudinal direction or serrated, considering also the type of wood of the shoot that is to be cut in correspondence of the buds and that can vary from one plant to another.

It should however be taken into consideration that the above selection of the curvature radiuses and their combination was obtained following extensive experimenting made necessary by the fact that nonspecific curved blades were found not capable of resolving the above-mentioned drawbacks.

The invention claimed is:

1. Secateurs for removing buds of tree shoots, comprising:
a grip portion and a cutting portion both arranged along a longitudinal axis and connected to each other with a joint, the joint having a rotation axis orthogonal to said longitudinal axis, wherein:
the cutting portion comprises two blades extending along the longitudinal axis symmetrically from the joint, each of the two blades including a first face opposite to a second face;
the first face has a concavity with a curvature radius along the longitudinal axis in correspondence of a cutting edge between 30 mm and 70 mm;
the second face has a convexity with a curvature radius transversal to said longitudinal axis between 40 mm and 60 mm; and
the two blades are non-deformable.

2. Secateurs according to claim 1, wherein the concavity of the blades extends along the longitudinal axis for 30-60 mm.

3. Secateurs according to claim 1, wherein each of the blades comprise a proximal portion and a distal portion with respect to the joint, each proximal portion having the concavity, which is a first concavity towards the first face of the blades, and the convexity, which is a first convexity towards the second face of the blades; and
each distal portion having a second convexity towards the first face of the blades and a second concavity towards the second face of the blades.

4. Secateurs according to claim 3, wherein a convexity of the cutting edge of the distal portion of the blades has a curvature radius along the axis between 30 and 50 mm.

5. Secateurs according to claim 4, wherein the proximal portion of the blades extends along the longitudinal axis for 30-50 mm and the distal portion extends along the longitudinal axis for 20-30 mm.

6. Secateurs according to claim 3, wherein the distal portion has a length of between 20 mm and 30 mm.

7. Method for removing buds from shoots of plants, comprising the steps of:
a) providing secateurs according to claim 1;
b) putting the blades of the secateurs onto a shoot of a plant so that the convexity surrounds a main bud and at least part of related secondary buds, or
c) putting said blades onto a shoot transversal to a longitudinal axis of the shoot so that the concavity surrounds the main bud and at least part of the related secondary buds;
d) performing a first cut of the main bud and of the at least part of the related secondary buds with one action;
e) putting again the blades as in the steps b) or c) and operating a second cut of buds or portions of buds that remain uncut.

8. Method according to claim 7, wherein the step b) is carried out putting the blades along the longitudinal axis of the shoot.

9. Method according to claim 7, wherein the step b) is carried out putting the blades transversally to the longitudinal axis of the shoot.

* * * * *